(12) United States Patent
Wang et al.

(10) Patent No.: US 9,656,289 B2
(45) Date of Patent: May 23, 2017

(54) AUTOMATIC PAINTING ON PLIABLE ITEMS

(71) Applicant: Nike, Inc., Beaverton, OR (US)

(72) Inventors: Guo-Chang Wang, Taichung (TW);
Patrick Conall Regan, Taichung (TW);
Shih-Yuan Wu, Taichung (TW);
Kuo-Hung Lee, Yunlin County (TW);
Wen-Ru Chang, Changhua County (TW)

(73) Assignee: NIKE, Inc., Beaverton, OR (US)

( * ) Notice: Subject to any disclaimer, the term of this patent is extended or adjusted under 35 U.S.C. 154(b) by 192 days.

(21) Appl. No.: 13/801,172

(22) Filed: Mar. 13, 2013

(65) Prior Publication Data

US 2014/0272191 A1 Sep. 18, 2014

(51) Int. Cl.
| | | |
|---|---|---|
| *B05C 21/00* | (2006.01) | |
| *B05C 13/00* | (2006.01) | |
| *B05B 15/04* | (2006.01) | |
| *B05B 13/02* | (2006.01) | |
| *B41F 15/00* | (2006.01) | |
| *B05C 17/06* | (2006.01) | |

(52) U.S. Cl.
CPC ........ *B05C 21/005* (2013.01); *B05B 13/0285* (2013.01); *B05B 15/045* (2013.01); *B05B 15/0425* (2013.01); *B05B 13/0221* (2013.01); *B05B 15/04* (2013.01); *B05C 17/06* (2013.01); *B41F 15/00* (2013.01); *Y02P 70/36* (2015.11)

(58) Field of Classification Search
None
See application file for complete search history.

(56) References Cited

U.S. PATENT DOCUMENTS

| | | | | |
|---|---|---|---|---|
| 3,716,022 | A | * 2/1973 | Szczepanski | ................. 118/326 |
| 3,919,967 | A | 11/1975 | Warning et al. | |
| 4,390,564 | A | * 6/1983 | Kimble | ............... B05B 13/0221 |
| | | | | 118/323 |
| 4,535,548 | A | * 8/1985 | Hyde | ............................. 34/267 |

(Continued)

FOREIGN PATENT DOCUMENTS

CA 2341809 A1 9/2002

OTHER PUBLICATIONS

International Search Report with Written Opinion dated Jun. 26, 2014 in Application No. PCT/US14/021879, 8 pages.

(Continued)

*Primary Examiner* — Binu Thomas
(74) *Attorney, Agent, or Firm* — Shook, Hardy & Bacon L.L.P.

(57) ABSTRACT

Aspects relate to systems and methods for dispensing paint uniformly on pliable items. The system comprises at least one paint application device having at least one nozzle, at least one infrared heating unit, and a conveyance mechanism. Other aspects of the system will also comprise a mask exchanger, a mask cleaner, and/or at least one base jig. The base jig retains a masked pliable item having exposed and covered portions. The base jig moves on a conveyance mechanism through a series of paint application devices and infrared heating units. Each paint application device dispenses a thin layer of paint on the exposed portions of the masked pliable item and each infrared heating unit heats the thin layer of paint to create a solid base for a next layer of paint.

15 Claims, 7 Drawing Sheets

(56) References Cited

U.S. PATENT DOCUMENTS

| | | | |
|---|---|---|---|
| 4,777,909 A | 10/1988 | Martin | |
| 5,060,594 A | 10/1991 | Tomioka | |
| 6,422,139 B1* | 7/2002 | DeCruz | 101/127.1 |
| 2004/0231183 A1* | 11/2004 | Makoto | F26B 3/283 34/270 |
| 2009/0090257 A1* | 4/2009 | Feldman et al. | 101/114 |

OTHER PUBLICATIONS

International Preliminary Report on Patentability dated Sep. 24, 2015 in Application No. PCT/US2014/021879, 7 pages.

* cited by examiner

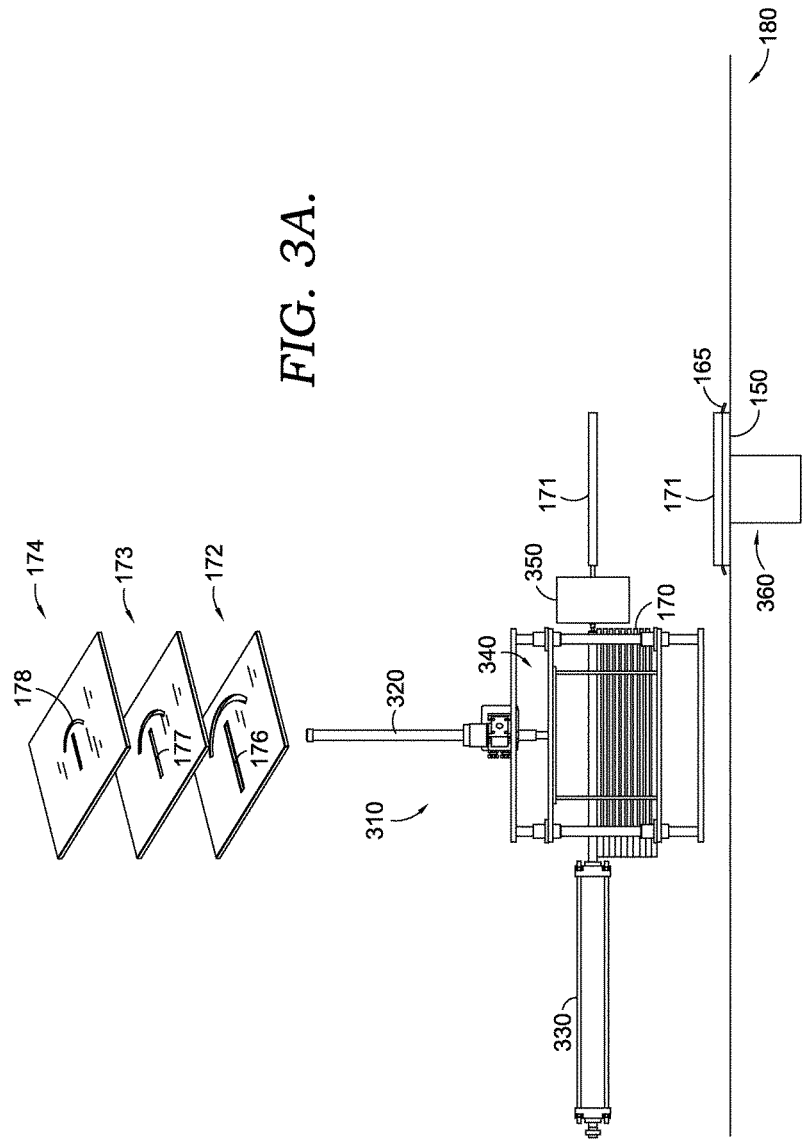

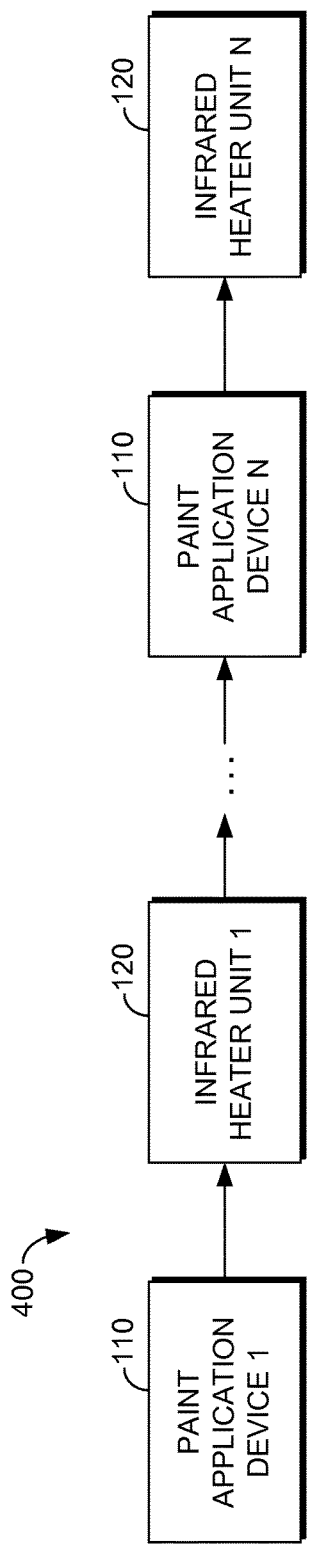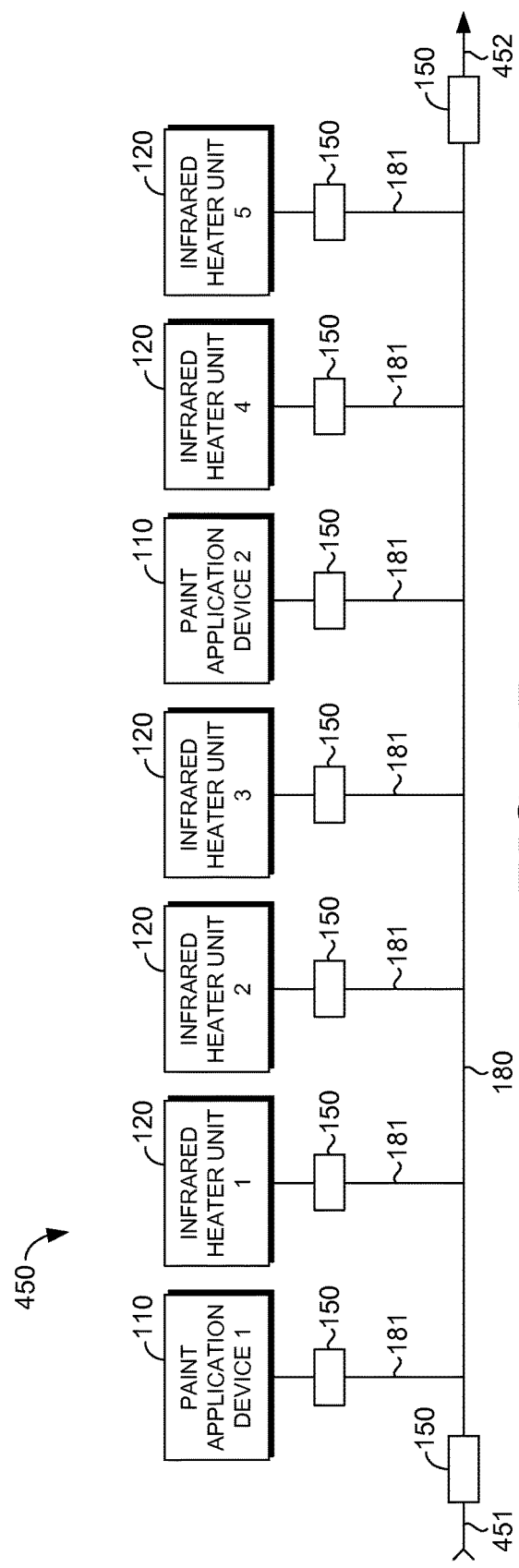

AUTOMATIC PAINTING ON PLIABLE ITEMS

CROSS-REFERENCE TO RELATED APPLICATION

Not applicable.

BACKGROUND

Traditional painting processes have caused paint to accumulate unevenly and inconsistently on pliable items, resulting in substandard aesthetics. Multiple thin layers of paint can be applied successively in order to attain uniform thickness and appearance. However, each layer of paint requires time to dry thereby significantly lengthening the process time.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects of the present invention relate to systems and methods for dispensing paint uniformly on pliable items. A pliable item may be a knit or woven textile such as a shoe upper. The system comprises one or more paint application devices and infrared heating units on a conveyance mechanism. The method comprises conveying a pliable item through paint application devices and infrared heating units. The pliable item is retained in a jig and covered by a mask. The jig and mask may vary according to the size of the pliable item. For instance, shoe uppers for a particular shoe size may require a mask containing patterns that are arranged and sized accordingly in order to achieve appropriate proportions and aesthetics. Initially, a paint application device applies a thin layer of paint over the pliable item. Then an infrared heating unit heats the pliable item to achieve timely hardening. Next, the same or a second paint application device applies a second thin layer of paint over the pliable item. The resulting painted pattern on the pliable item will have uniform color coverage and depth.

BRIEF DESCRIPTION OF THE SEVERAL VIEWS OF THE DRAWINGS

Illustrative aspects of the present invention are described in detail below with reference to the attached drawing figures, which are incorporated by reference herein and wherein:

FIGS. 3A-3B depict side views of an exemplary mask exchanger and cleaner, in accordance with aspects of the present invention;

FIGS. 4A-4B depict block diagrams illustrating exemplary layouts of an automatic paint dispensing system;

DETAILED DESCRIPTION

The subject matter of aspects of the present invention is described with specificity herein to meet statutory requirements. However, the description itself is not intended to limit the scope of this patent. Rather, the inventors have contemplated that the claimed subject matter might also be embodied in other ways, to include different elements or combinations of elements similar to the ones described in this document, in conjunction with other present or future technologies.

Aspects of the present invention relate to systems and methods of dispensing paint uniformly on pliable items. In one aspect, the present invention provides a system that comprises at least one paint application device and at least one infrared heating unit on a conveyance mechanism. Each paint application device may further comprise one or more nozzles. Each nozzle can dispense paint in a variety of colors, either simultaneously or alternately, onto pliable items, from various distances or angles. Each infrared heating unit can operate over varying surface areas and from various distances. In addition, the system may also comprise a mask exchanger on the conveyance mechanism that contains a plurality of masks of different patterns, designed to cover over the surfaces of pliable items of varying sizes. Furthermore, the system may also include a mask cleaner that cleans a mask after the painting process and before the mask is returned to the mask exchanger. The system as a whole is adaptable for use with a variety of pliable items such as shoe uppers, sweaters, scarves, hats, and gloves. In addition, the system can be a component of a larger automated painting production line.

In another aspect, the present invention provides a system that comprises a base jig for retaining masked pliable items, multiple paint application devices, and multiple infrared heating units on a conveyance mechanism. The conveyance mechanism conveys a plurality of base jigs through the system wherein each base jig of the plurality of base jigs retains a masked pliable item.

In yet another aspect, the present invention provides a method for dispensing paint uniformly on pliable items. The method comprises alternately dispensing a thin layer of paint onto a masked pliable item and hardening the layer of paint using an infrared heating unit.

Having briefly described an overview of aspects of the present invention, a more detailed description follows.

Figure 1A:
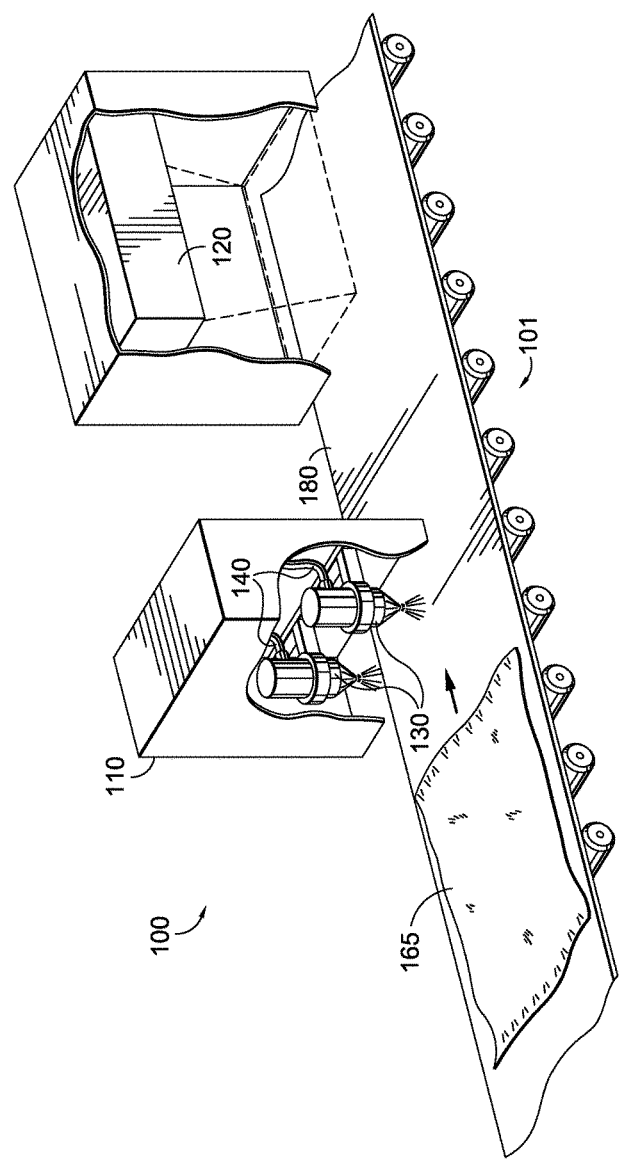
FIGS. 1A-1B depict side perspective views of an exemplary paint dispensing system, in accordance with aspects of the present invention.

FIG. 1A depicts a side perspective view of an exemplary paint dispensing system 100 comprising a paint application device 110 and a infrared heating unit 120, in accordance with aspects of the present invention.

Paint application device 110 receives a pliable item 165 on conveyance mechanism 180. The pliable item 165 can be either secured to conveyance mechanism 180 or retained by a base jig 150 (see FIG. 2). Each paint application device 110 comprises one or more nozzles 130. Although two nozzles 130 are shown in FIG. 1A, some aspects of the present invention may only require one nozzle to operate. Paint application device 110 delivers paint to the nozzles 130 via internal conduits 140. Conduits 140 can be pipes or tubes made out of metal, plastic, or a composite material. Each conduit 140 may carry a particular color of paint and be connected to a particular nozzle 130. Multiple nozzles 130 may dispense multiple different colors of paint simultaneously onto pliable item 165. Alternatively, conduits 140 may merge at a junction wherein different color paints mix together before being dispensed through a common nozzle 130. Nozzles 130 may work in tandem to paint one pattern on pliable item 165 or may operate independently to simultaneously paint multiple distinct patterns on pliable item 165. Nozzles 130 may dispense paint by spraying streams of liquid paint, spraying clouds of gaseous paint, or dripping spots of solid paint. The paint dispensed may be water-based, oil-based, or of another type. In other aspects of the present invention, nozzles 130 may dispense non-paint substances such as adhesive, texturing compound, sealant, or foam. Nozzles 130 may be detached and replaced by other nozzles differing in orifice dimensions thereby changing the flow and pressure of the dispensed paint as well as the coverage area on the pliable item 165. Nozzles 130 having narrow coverage area can paint with thinner lines and in greater detail. The paint application device 110 may be programmed to orient one or more nozzles 130 at a particular angle and to paint according to a particular pattern. For instance, the pliable item 165 may be held stationary while nozzles 130 follow a particular path within the confines of the paint application device 110 in order to paint a particular pattern. Nozzles 130 may move by negotiating a system of rails inside the paint application device 110 or by being attached to the ends of robotic arms extending from the paint application device 110. Alternatively, the nozzles may be stationary and the pliable item 165 may move about by following a particular path on conveyance mechanism 180. The time duration of dispensing paint may be predetermined depending on the painted pattern, coverage area, type of paint, and other factors.

Figure 1B:
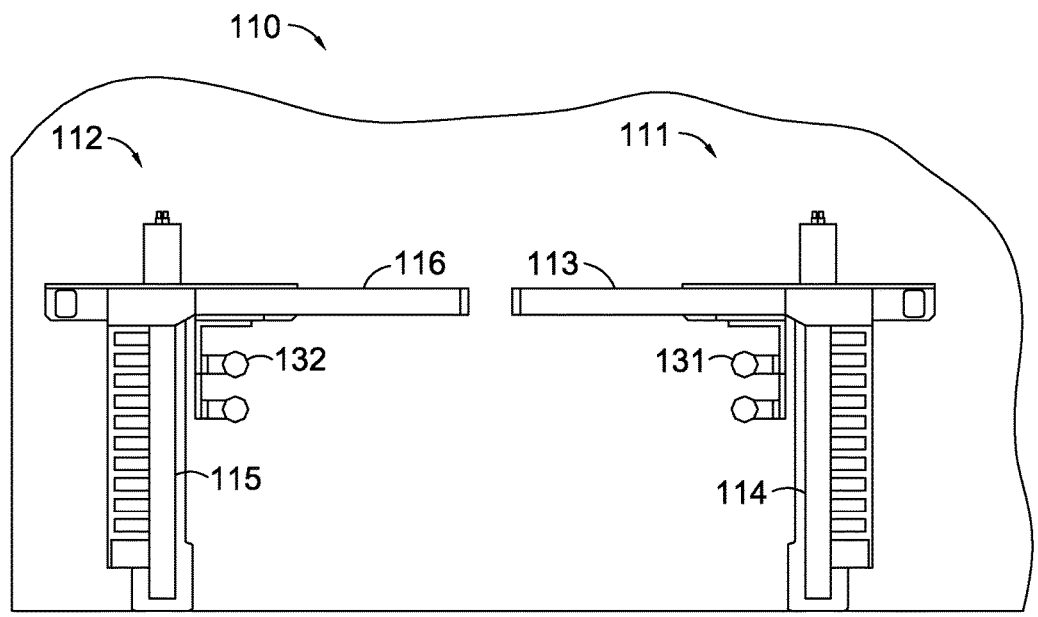

Turning briefly now to FIG. 1B, an exemplary paint application device 110 is shown having nozzles 131-132 and rail sets 111-112. Rail set 111 has two rails 113 and 114 that are perpendicular to each other. Nozzles 131 can move along either rail 113 or 114. Rail set 112 also has two rails 115 and 116 that are oriented perpendicular to each other. Nozzles 132 can move along either rail 115 or 116. When dispensing paint, nozzles can either move in a straight line or in a non-straight line by adjusting direction accordingly on the rail sets. For instance, nozzles 131 may move along 114 to paint a straight line. Nozzles 131 may also move along rail 114 while rail 114 simultaneously moves incrementally along rail 113 to paint a curve. By dispensing paint only along a specific path on the pliable item instead of covering the entire surface area of the pliable item may save paint as well as process time. In addition, the two nozzles of 131 may dispense different color paints such as black and white. Furthermore, rails 111 and 112 may operate in tandem or independently. For instance, rails 111 and 112 may dispense paint onto two separate pliable items simultaneously. Although two rail sets are shown, each containing two nozzles, alternative paint application devices 110 may contain any number of rail sets, each containing any number of nozzles.

Turning back to FIG. 1A, the infrared heating unit 120 uses infrared wavelength electromagnetic radiation to dry the paint on pliable item 165 in order to create a solid base on which the next layer of paint can be dispensed. Infrared radiation may be more effective than other forms of heating due to speed of operation, energy efficiency, and less space requirement. In other aspects of the present invention, the infrared heating unit 120 may be used in conjunction with other devices such as a fan or a dehumidifier to dry paint. Infrared heating unit 120 receives the pliable item 165 on the moving conveyance mechanism 180. Pliable item 165 can be secured to the conveyance mechanism 180 or retained inside a base jig 150 (see FIG. 2) while being received by infrared heating unit 120. Infrared heating unit 120 can be adjusted manually or automatically according to predetermined parameters. Examples of predetermined parameters include the area being heated, air temperature desired, and the duration of heating.

In addition, infrared sources may be selected for use based upon how well the emitted wavelength matches the absorption properties of the paint to be heated. For instance, infrared sources having a relatively high amount of emissions within the mid infrared range of the spectra may be highly effective at drying water-based paint. Both carbon infrared emitters and medium wave infrared emitters emit within the mid infrared range of the spectra. However, carbon emitters may have the advantage of speedier activation. Faster activation time allows carbon emitters to be turned on or off quickly and often thereby expending less energy. For instance, the infrared heating unit is only used when receiving a pliable item. Therefore, when the infrared heating unit is idle, carbon emitters therein may be powered off in order to conserve energy.

Figure 2:
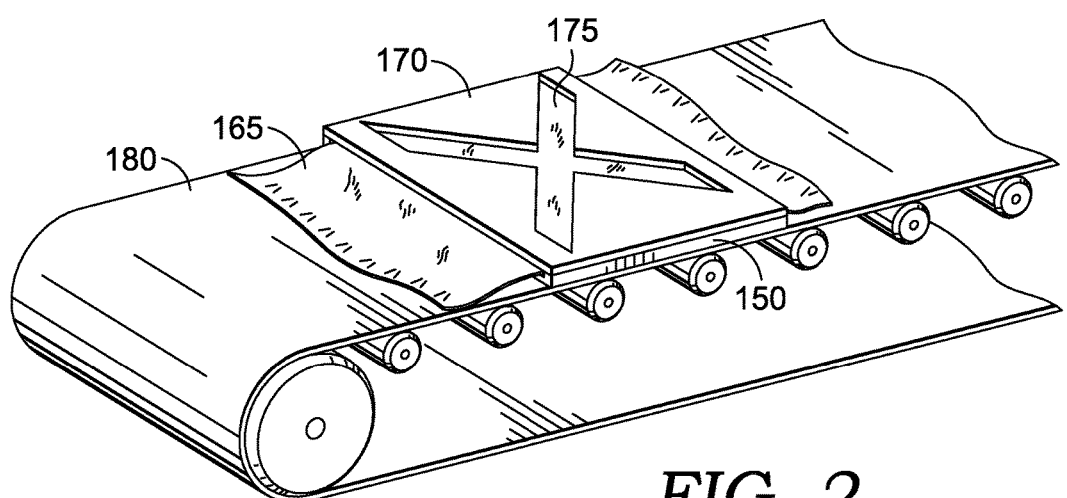
FIG. 2 depicts a side perspective view of an exemplary base jig retaining a masked pliable item.

Turning now to FIG. 2, an exemplary base jig is shown retaining a masked pliable item. The base jig 150 retains the masked pliable item 165 in a stretched or extended arrangement. The base jig 150 may be in the shape of a plate and moves through the system on conveyance mechanism 180. Some aspects of the present invention may require multiple base jigs 150 to move on conveyance mechanism 180 simultaneously. The base jig 150 may have clamps or other devices to fix the pliable item 165 in place. A single base jig 150 may be suitable to accommodate different sizes of pliable items 165. For instance, the base jig 150 may be collapsible or expandable into different sizes. The base jig 150 may be oriented flat on the conveyance mechanism 180 as shown in FIG. 2 or vertically, perpendicular to the conveyance mechanism 180. If the latter, then the paint application device 110 may need to angle nozzles 130 accordingly in order to paint the pliable item 165. In addition, if the latter, then the infrared heating unit 120 may also need to orient accordingly in order to apply heat effectively. The pliable item 165 may be knit, woven, leather, plastic, or any other appropriate material. For instance, the pliable item 165 may be the knit upper on an athletic shoe, such as a running shoe. In this example, the size of the knit upper depends on the size or style of the shoe. For instance, there may be multiple base jigs 150 in the system, each configured to retain a shoe upper corresponding to a particular shoe size in a fully stretched arrangement.

With continued reference to FIG. 2, mask 170 functions to cover pliable item 165 as pliable item 165 is retained by base jig 150 and moved on conveyance mechanism 180. Each mask 170 may be configured according to the size and type of the base jig 150 and/or the pliable item 165. When placed over pliable item 165, mask 170 covers a portion of the pliable item 165 and exposes portion 175 of the pliable item 165 such that after the painting process, only the exposed portion 175 is covered in paint. For instance, the mask 170 exposes a portion of the pliable item 165 in the shape of the letter "X." Therefore, after the painting process, an "X" of the same shape and size as shown on mask 170 appears on the pliable item 165. In addition, for different sizes of mask 170, the pattern will be arranged and proportioned differently. For instance, if the "X" were to be painted on a shoe upper, then the size, orientation, and shape of the pattern on mask 170 must be commensurate with the corresponding shoe size or style. The letter "X" needs to be larger for larger shoe sizes in order to preserve the proportions between "X" and other parts of the shoe. The mask 170 can also be configured to leave multiple distinct patterns on pliable surface 165. When there are multiple distinct patterns such as multiple X's in a cluster, the location of each X and the distance between them may also need to be modified for different shoe sizes. More specifically, the distances between X's on the uppers of larger shoes need to be spaced farther apart. The mask 170 can be configured to cover and expose any variety of patterns on the pliable surface, rather than the example of an "X" illustrated in the drawings and described herein. Examples of patterns may include one or more logos, words, and/or geometric shapes. The pattern may be used for aesthetic purposes or functional purposes, such as alignment indication. For instance, the mask 170 may leave a visible line on the pliable surface 165 to be used later for guiding an automatic cutting machine to cut the pliable surface 165 or to facilitate alignment with other parts during assembly.

Figure 3B:
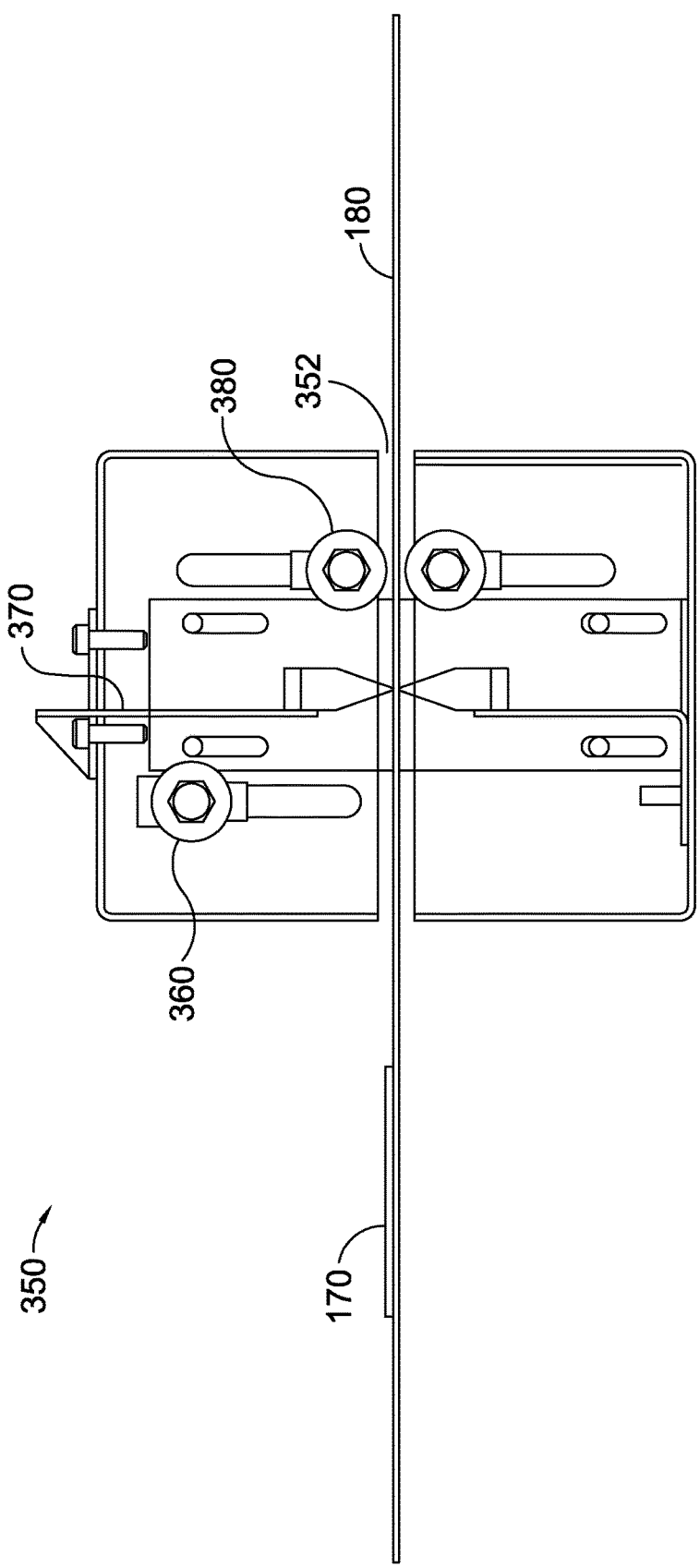

Turning now to FIG. 3A, a mask exchanger in accordance with aspects of the current invention is shown. The mask exchanger 310 may be located on or about the conveyance mechanism 180. Mask exchanger 310 comprises lifter 320, pusher 330, and cassette deck 340. Some aspects of the present invention may also include a mask cleaner 350 that may either be attached to or independent of mask exchanger 310. Cassette deck 340 contains one or more slots wherein each slot retains a mask 170. Masks may contain different arrangements of covered and exposed portions thereby capable of forming different patterns on the surface of pliable items. Alternatively, masks may be of different shapes and sizes. When a mask of a particular pattern arrangement is required by a particular pliable item 165, the lifter 320 adjusts the cassette deck 340 by the appropriate displacement in order to align the correct mask 170 with pusher 330. Then, pusher 330 pushes the correct mask 170 out of the cassette deck 340 and onto the pliable item 165 located on the opposite side of the mask exchanger 310. There may also be an elevation device 360 that transports the masked pliable item 165 between the mask exchanger 310 and the conveyance mechanism 180. After the paint dispensing process and before mask 170 is returned to the mask exchanger 310, the mask may be cleaned by mask cleaner 350 (described in more detail in FIG. 3B below). The process of retrieving, cleaning, and returning masks may be automated. Alternatively, mask exchanger 310 may be operated manually. Mask exchanger 310 may be capable of automatically mounting the mask 171 on top of the pliable item 165. Mask exchanger 310 may also be capable of automatically securing the mask 171 to the base jig 150 such that the mask 171 stays in place throughout the painting process.

Turning briefly now to FIG. 3B, an exemplary mask cleaner is shown. Mask cleaner 350 comprises water sprayer 360, wiper 370, and air nozzle 380. After a mask 170 has been painted and heated, it may need to be cleaned before being reused. Mask 170 may be received by cleaner 350 through adjustable gap 352 on conveyance mechanism 180. Adjustable gap 352 may be widened or narrowed depending on the thickness of mask 170 and/or base jig 150. Water sprayer 360 may dispense water streams from a nozzle in order to rinse off loose paint or debris from the surface of mask 170. Wiper 370 may wipe mask 170 with a brush or chisel in order to eliminate paint or debris attached to the surface of mask 170. Air nozzle 380 may blow hot or cold air in order to eliminate small particles of paint or debris from the surface of mask 170. Water sprayer 360, wiper 370, and air nozzle 380 may operate on mask 170 in any order. After mask 170 has been cleaned by cleaner 350, it is returned to the mask exchanger 310 for future reuse.

Turning back to FIG. 3A, mask exchanger 310 may contain masks 172-174 as shown in an exploded view above mask exchanger 310. The dimensions of masks 172-174 may be uniform in order to be accommodated by the mask exchanger 310. That is to say, masks 172-174 may all have the same length, width, and thickness. Alternatively, a mask exchanger 310 may be manufactured to accommodate masks of varying sizes and shapes. Mask exchanger 310 may dispense the appropriate mask depending on the size or type of the pliable item 165 and/or base jig 150. For instance, if the pliable item 165 were a shoe upper, then the appropriate mask should have a pattern sized and proportioned according to the size and shape of the painting area on the corresponding shoe upper. The proportion between the painted pattern on the surface of the shoe upper and the total surface area of the shoe upper should remain consistent for all shoe sizes. Therefore, larger shoe uppers have larger painting areas and should require larger exposed and covered portions on the mask. In addition to proportion, other parameters such as orientation or density of the painted pattern may also need to be reconfigured for different sizes of shoe uppers for aesthetic reasons. The size and proportion of the pattern on mask 172, for example, may be suitable for the shoe upper on a men's size 11 tennis shoe while the size and proportion of the pattern on mask 173 may be appropriate for the shoe upper on a men's size 10 tennis shoe. The size and proportion of the pattern on mask 174 are the smallest and may be suitable for the shoe upper on a women's size 9 tennis shoe. In practice, a wider range of pattern sizes and proportions may be implemented in accordance with the present invention than are described in the present example. Although masks 172-174 have the same pattern in FIG. 3A, in other aspects of the present invention they may all have different patterns.

With continuing reference to FIG. 3A, the patterns on masks 172-174 may be sized and configured according to the size and shape of the corresponding shoe size. For instance, the exposed portions 176-178 on masks 172-174, respectively, each forms an arch and a straight line. In order to preserve the proportion between the pattern and the shoe upper, the arch and straight line have the largest dimensions on mask 172, smaller dimensions on mask 173, and smaller still on mask 174. In addition, the distance between the center of the arch and the tip of the straight line closest to the arch is also widest for mask 172, narrower for mask 173, and narrower still for mask 174. The paint application device 110 may operate according to the type of mask pursuant to pre-programmed parameters. For instance, the movement of nozzles 130 may correspond to the shape of the exposed opening in the mask in order to more accurately cover the target area and to avoid dispensing unnecessary paint. More specifically, after identifying the mask to be mask 172, nozzles 130 may dispense paint by following a linear path to paint the vertical line opening and a curved path to paint the arched opening.

When a layer of paint comes in contact with the surface of a pliable item, the paint may either bead up and remain on the surface of the pliable item or fill the recesses underneath the surface. When both happen after dispensing multiple layers of paint, uneven accumulation of paint may develop, resulting in non-uniform thickness of paint across the surface of the pliable item. This may be aesthetically or tactilely unappealing. Paint beads up and remains on the surface due to the paint's inherent surface tension and due to the texture of the surface of the pliable item. Ordinarily, paint with thick layers has higher surface tension and therefore is more likely to bead up and form a membrane-like sheen over the surface of the pliable item. Knit and woven textiles are particularly susceptible to uneven accumulation of paint because their interlocked yarns or threads create deep grooves and sub-surface recesses. For instance, a knit item may contain portions of different knit or stitch densities. Portions with high knit densities are characterized by smaller and denser openings on the surface. Portions with low knit densities are characterized by larger and more dispersed openings on the surface. The paint may interact differently with openings of different sizes and densities, sometimes beading up on the surface and sometimes flowing into the recesses.

Applying successive layers of sufficiently thin paint over a pliable surface may overcome problems caused by varying knit densities and thick paint. A sufficiently thin layer of paint has low surface tension and therefore is less likely to bead up over openings and more likely to flow into the recesses. In addition, combining infrared heating with successive application of thin paint layers achieves greater process efficiency. The infrared heat can quickly dry paint layers enabling the next layer of paint to be applied in a timely manner.

Turning to FIG. 4A, a block diagram illustrating an exemplary layout of an automatic paint dispensing system 400 is shown. Although only one production line is shown, system 400 may comprise multiple production lines, each configured to comprise any number of paint application devices 110 and infrared heating units 120. Paint application devices 110 and infrared heating units 120 may be arranged alternately as shown or arranged according to throughput. For an explanation of arrangement by throughput, turn now to FIG. 4B.

FIG. 4B is a block diagram illustrating an exemplary layout of an automatic paint dispensing system 450. System 450 has two paint application devices 110 and five infrared heating units 120. In some examples, it may take significantly longer to dry a painted pliable item with an infrared heating unit 120 than it may take to paint a pliable item with a paint application device 110. Therefore, under this scenario, in order to maintain a continuous throughput in production, the number of infrared heating units 120 may be higher than the number of paint application devices 110. FIG. 4B shows multiple base jigs 150 each retaining a masked pliable item (not shown in the interest of simplicity) moving through the system 450. Each base jig 150 enters system 450 at location 451 and exits system 450 at location 452. Each base jig 150 moves through system 450 on conveyor mechanism 180. If a base jig 150 has just been painted by a paint application device 110 and needs to be dried off, system 450 will send the base jig 150 to the next available infrared heating unit 120. Movements of base jigs 150 are synchronized such that no machine is idle and no base jig 150 waits for more than a predetermined amount of time on the conveyor mechanism 180. In addition, when ready to be painted or heated, system 450 may push the base jig 150 off the main conveyor mechanism 150 and down the appropriate chute 181 towards the appropriate machine in order to not create a bottleneck in conveyance mechanism 180 and let other base jigs 150 pass through. Alternately, to achieve the same effect of avoiding bottleneck, a base jig 150 may be picked up and elevated above the conveyance mechanism 180 and then received by the appropriate machine.

Examples of conveyance mechanism 180 may include belt conveyor, chain conveyor, and roller conveyor. The conveyance mechanism 180 may also incorporate pushers, air pressure, or suction in order to move the base jigs 150. The conveyance mechanism may be straight, curved, or closed loop in the shape of a circle or a square. If closed loop, then a base jig 150 may pass through the same paint application device 110 and infrared heating unit 120 multiple times before exiting the conveyance mechanism 150. In addition, the paint application devices 110 and infrared heating units 120 may be mounted on the conveyance mechanism 180 such that enough space is provided underneath for the three-piece ensemble of base jig 150, pliable item, and mask to gain passage. Alternatively, the paint application devices 110 and infrared heating units 120 may be suspended from above or extended from robotic arms to receive and operate on the masked pliable item or the aforementioned three-piece ensemble. Different production lines 450 may be operating at the same time. In another aspect of the present invention, instead of conveying the base jig 150 to different positions along conveyance mechanism 180, the paint application devices 110 and infrared heating units 120 may be conveyed to the location of a stationery base jig 150. In another example, the production system may use a user to convey the base jig 150 from one station to another instead of using a conveyance mechanism 180. In such an example, the user will be able to set the various operational attributes of paint application device 110 and infrared heating unit 120 manually.

Figure 5:
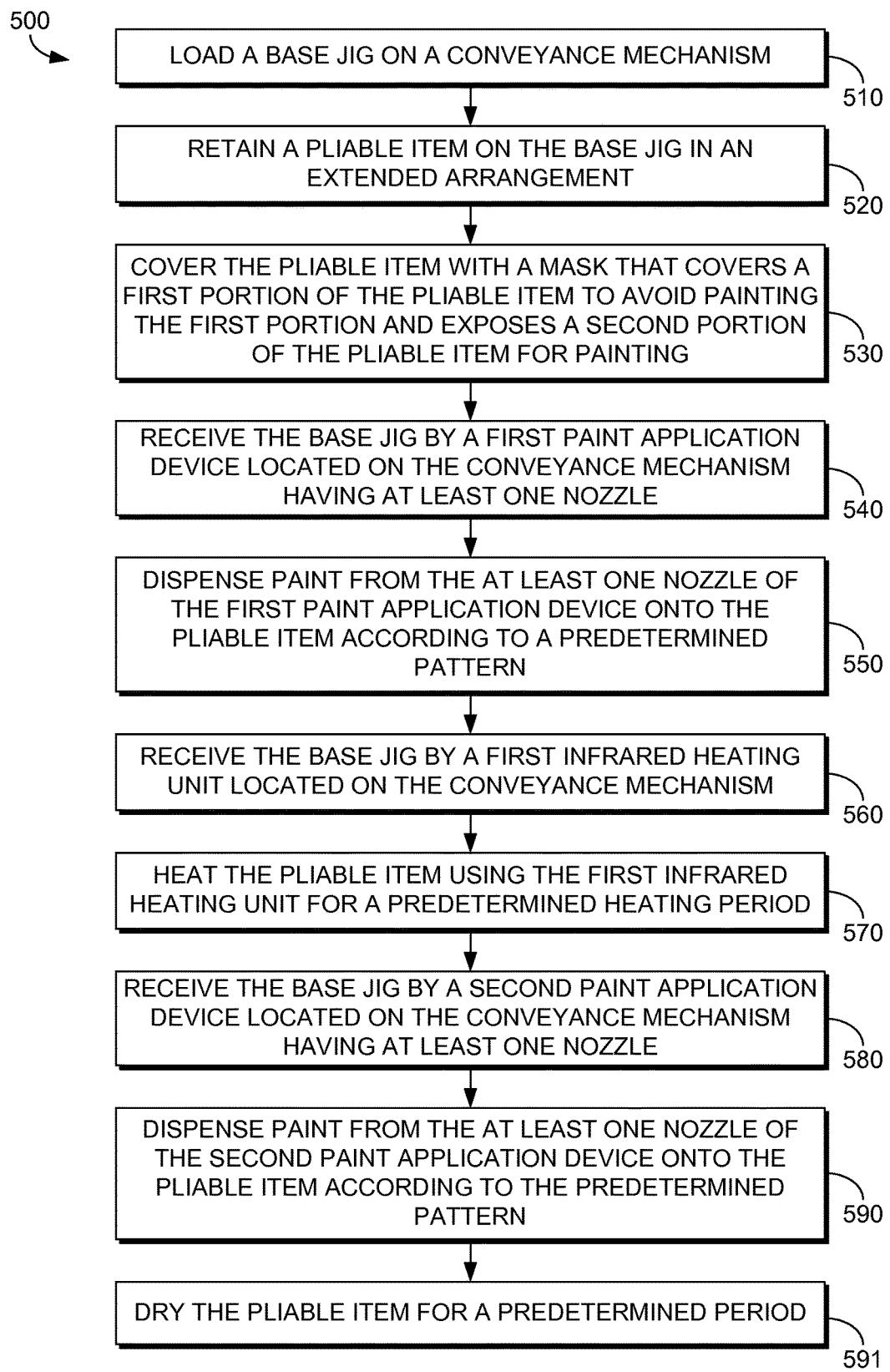
FIG. 5 depicts an exemplary method of automatically dispensing paint, in accordance with aspects of the present invention.

Turning now to FIG. 5 which illustrates an exemplary method 500 for automatically dispensing paint, in accordance with aspects of the present invention. In step 510, load a base jig onto on a conveyance mechanism. The base jig is configured to fit the width of the conveyance mechanism and made out of a material that prevents slipping. Examples of conveyance mechanisms include belt conveyor and chain conveyor. In step 520, retain a pliable item on the base jig in an extended arrangement. Examples of pliable items can be knit shoe uppers, woven material, and plastic sheets. The pliable item is stretched out in order to render its surface flat, free from folds or wrinkles. For instance, the base jig may be in the form of a flat tray with a bottom side and top side. The bottom side is in contact with the conveyance mechanism and the top side retains the pliable item. In step 530, cover the pliable item with a mask that covers a first portion of the pliable item to avoid painting the first portion and exposes a second portion of the pliable item for painting. The mask may be generated by a mask exchanger that contains a plurality of masks of different patterns or variations of the same pattern. The pliable item is sandwiched between the mask and the base jig. The mask is configured to fit on top of the base jig without slipping.

In step 540, a first paint application device located on the conveyance mechanism having at least one nozzle receives the base jig with the masked pliable item retained thereon. The base jig may be moved by the conveyance mechanism to the area beneath the first paint application device. There, the conveyance mechanism may pause for a predetermined time period while the base jig is painted on by the first paint application device. Alternately, the conveyance mechanism may proceed at a constant pace. The base jig may also be removed from the conveyance mechanism and be painted remotely. In step 550, the at least one nozzle of the first paint application device dispenses paint onto the pliable item according to a predetermined pattern. The nozzles may dispense paint while the base jig is moving. This can be accomplished if the nozzles can tilt in the direction of the base jig's movement at a commensurate speed. Alternatively, the base jig moves at a speed where one quick burst of spray paint from the nozzles is sufficient to cover the exposed portions of the pliable item.

In step 560, a first infrared heating unit located on the conveyance mechanism receives the base jig retaining the masked pliable item. The infrared heating unit may be parallel to the surface of the masked pliable item. In step 570 the infrared heating unit heats the paint on the exposed portions of the masked pliable item for a predetermined heating period thereby creating a solid base for the next layer of paint. The infrared heater may be equipped with overheat alarm and adjustable heating area functions.

In step 580, a second paint application device located on the conveyance mechanism having at least one nozzle receives the base jig retaining the masked pliable item. This step may be identical to step 540. In step 590, the at least one nozzle of the second paint application device dispenses paint onto the pliable item according to the predetermined pattern. This step may be identical to step 550.

In step 591, the system has the option to dry the masked pliable item retained in the base jig for a predetermined drying period. The drying process may involve putting the masked pliable item into a conventional oven. Alternately, the masked pliable item retained in the base jig may go through additional paint application devices and infrared heating devices depending on the thickness of paint desired on the exposed portion of the masked pliable item. For instance, if the paint application device dispenses a layer measuring 0.1 mm in thickness each time, then to reach a thickness of 1 mm, the masked pliable item retained in the base jig will need to alternately go through 10 paint application devices and 9 infrared heating units. However, there does not need to be 10 individual paint application devices and 9 infrared heating units if the conveyance mechanism forms a loop such that the base jig moves through the same paint application devices and infrared heating units multiple times.

Figure 6:
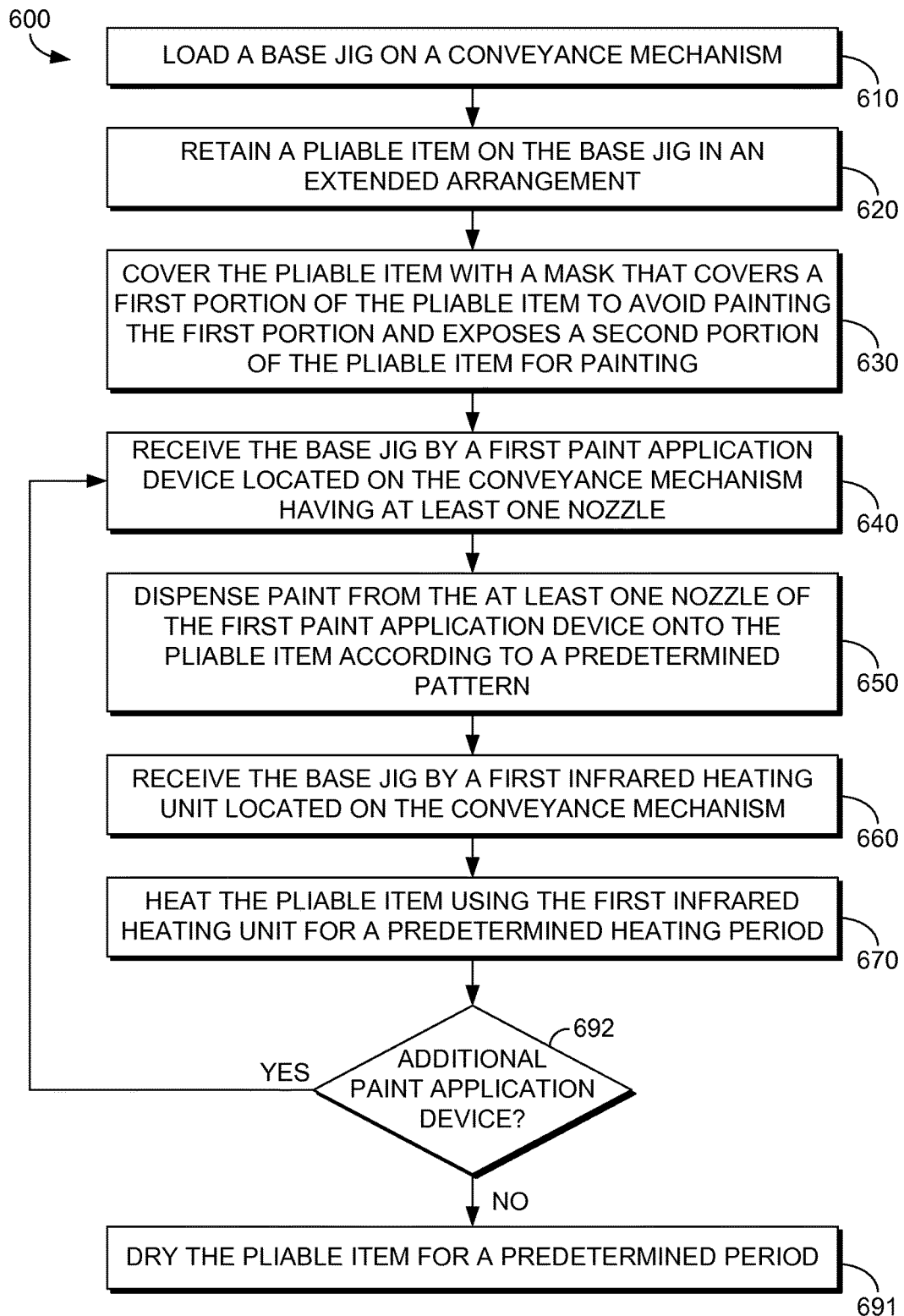
FIG. 6 depicts an exemplary method of automatically dispensing paint, in accordance with aspects of the present invention.

Turning now to FIG. 6 which illustrates an exemplary method 600 for automatically dispensing paint, in accordance with aspects of the present invention. Steps 610 to 670 may be identical to steps 510 to 570 of FIG. 5, respectively. Step 692 loops back to step 640 if there are additional paint application devices to receive and paint the pliable item. If yes, then steps 640-670 are repeated once again. If no, then the method proceeds to step 691 which may be similar to step 591 of FIG. 5. The additional paint application devices may be different from or the same as previously mentioned paint application devices.

Exemplary aspects are provided herein for illustrative purposes. Additional extensions/aspects are also contemplated in connection with aspects of the present invention. For example, a number, size, orientation, and/or form of components, portions, and/or attributes are contemplated within the scope of aspects of the present invention.

The invention claimed is:

1. A system for automated painting of pliable items comprising:
   a conveyance mechanism that conveys a pliable item through the system;
   a mask exchanger located on the conveyance mechanism that contains a plurality of masks, wherein each mask of the plurality of masks having a geometry that covers a first portion of the pliable item to avoid painting the first portion and exposes a second portion of the pliable item for painting, the plurality of masks of having similar geometries but covering and exposing different amounts of the pliable item;
   a first paint application device that receives a masked pliable item on the conveyance mechanism, wherein the masked pliable item has the first portion obscured by a mask and the second portion exposed by the mask for painting, the at least a first paint application device having at least one nozzle that dispenses a coat of paint over the masked pliable item, such that paint does not reach the first portion of the pliable item but does reach the second portion of the pliable item exposed by the mask; and
   a first infrared heating unit that receives the painted masked pliable item and the mask on the conveyance mechanism and, when activated, the at least a first infrared heating unit operable to emit infrared wavelength electromagnetic radiation upon the coat of paint on the second portion of the pliable item exposed by the mask, wherein the wavelength of the infrared wavelength electromagnetic radiation is selected to match absorption properties of the coat of paint;
   at least a second paint application device that receives the painted masked pliable item and the mask on the conveyance mechanism from the first infrared heating unit; and
   at least a second infrared heating unit that receives the painted masked pliable item and the mask on the conveyance mechanism from the at least second paint application device.

2. The system of claim 1, wherein the at least a first paint application device comprises a plurality of paint application devices; and
   wherein the at least a first infrared heating unit comprises a plurality of infrared heating units.

3. The system of claim 1, wherein the plurality of masks contained in the mask exchanger comprise masks having different configurations of covered and exposed portions.

4. The system of claim 1, further comprising a base jig that retains the pliable item in an extended arrangement.

5. The system of claim 1, wherein the at least a first paint application device further comprises a first pipe delivering a first color to a first nozzle and a second pipe delivering a second color to a second nozzle.

6. The system of claim 5, wherein the first nozzle and the second nozzle are capable of dispensing paint at the same time either in tandem or independently.

7. The system of claim 1, wherein the at least a first infrared heating unit is configured to adjust a heating area according to a size of the pliable item.

8. The system of claim 1, further comprising a mask cleaner that cleans the mask after the system has completed dispensing paint on and heating the masked pliable item and before the mask is returned to the mask exchanger.

9. A system for automated painting of pliable items comprising:
   a base jig that retains a pliable item in an extended arrangement;
   a mask that covers a first portion of the pliable item retained by the base jig to avoid painting the first portion and exposes a second portion of the pliable item for painting;
   a conveyance mechanism that moves a plurality of base jigs retaining pliable items through the system;
   a first paint application device that receives the base jig retaining the masked pliable item on the conveyance mechanism, wherein the masked pliable item has the first portion obscured by a mask and the second portion exposed by the mask for painting, the at least a first paint application device having at least one nozzle that dispenses a coat of paint on the second portion of the pliable item retained by the base jig and exposed by the mask;

a first infrared heating unit that receives the base jig retaining the masked and painted pliable item from the conveyance mechanism and, when activated, emits infrared wavelength electromagnetic radiation upon the coat of paint on the second portion of the pliable item retained by the base jig and exposed by the mask, wherein the wavelength of the infrared wavelength electromagnetic radiation is selected to match absorption properties of the coat of paint;

at least a second paint application device that receives the painted masked pliable item and the mask on the conveyance mechanism from the first infrared heating unit; and at least a second infrared heating unit that receives the painted masked pliable item and the mask on the conveyance mechanism from the at least second paint application device.

10. The system of claim 9, wherein the size of the base jig is commensurate with the size of the pliable item.

11. The system of claim 9, wherein the size of the mask is commensurate with the size of the pliable item.

12. The system of claim 4, wherein a size of the mask is commensurate with the size of the base jig.

13. The system of claim 4, wherein the base jig is collapsible or expandable.

14. The system of claim 4, wherein the base jig is elevated above the conveyance mechanism.

15. The system of claim 9, wherein a size of the mask is commensurate with the size of the base jig.

* * * * *